(12) United States Patent
Wabnegger et al.

(10) Patent No.: US 11,958,728 B2
(45) Date of Patent: Apr. 16, 2024

(54) SYSTEMS AND METHODS FOR DRYING AND CLEANING AN AERIAL LIFT ELECTRICALLY INSULATED BOOM

(71) Applicant: Quanta Associates, L.P., Houston, TX (US)

(72) Inventors: David Karl Wabnegger, Burnaby (CA); Daniel Neil O'Connell, Burnaby (CA); David James Ball, La Grange, TX (US); Robert Wayne Palmer, Houston, TX (US); Jody Milton Greer, Houston, TX (US); Raymond Henry Jodoin, Burnaby (CA)

(73) Assignee: Quanta Associates, L.P., Houston, TX (US)

( * ) Notice: Subject to any disclaimer, the term of this patent is extended or adjusted under 35 U.S.C. 154(b) by 1582 days.

(21) Appl. No.: 16/164,403

(22) Filed: Oct. 18, 2018

(65) Prior Publication Data
US 2019/0112172 A1    Apr. 18, 2019

Related U.S. Application Data

(60) Provisional application No. 62/574,005, filed on Oct. 18, 2017.

(30) Foreign Application Priority Data

Nov. 23, 2017  (CA) ..................... 2986535

(51) Int. Cl.
*B66F 17/00*    (2006.01)
*B08B 5/02*    (2006.01)
(Continued)

(52) U.S. Cl.
CPC .............. *B66F 17/006* (2013.01); *B08B 5/02* (2013.01); *B08B 7/0071* (2013.01); *B66F 11/044* (2013.01); *B66F 13/00* (2013.01)

(58) Field of Classification Search
CPC ...... B66F 17/006; B66F 11/044; B66F 13/00; B66F 11/04; B66F 11/046; B08B 5/02;
(Continued)

(56) References Cited

U.S. PATENT DOCUMENTS 2,815,250 A * 12/1957 Thornton-Trump ........................ B66F 11/044
                                                                        182/112
3,320,524 A    5/1967 Miller
(Continued)

FOREIGN PATENT DOCUMENTS

CN    101887788 A    11/2010
JP    S58 127080 U    8/1983

OTHER PUBLICATIONS

Copenheaver, Blaine R., International Search Report for PCT/US2018/056528, dated Jan. 8, 2019, 2 pages, ISA/US, Alexandria, Virginia.
(Continued)

*Primary Examiner* — Logan M Kraft
*Assistant Examiner* — John D Bailey
(74) *Attorney, Agent, or Firm* — Oathout Law Firm; Elizabeth Gray; Antony C. Edwards

(57) ABSTRACT

A system is provided for use with an insulated boom section of a bucket truck. The system includes a source of high volume and pressure, dry air; one or more interior air diffusers connected to the source of high volume and pressure, dry air to direct the air into an interior of the insulated boom section. One or more exterior air diffusers connected to the source of high volume and pressure, dry air direct the air to along an exterior surface of the insulated boom section. A method is also provided for cleaning or drying both the interior and exterior surfaces simultaneously of an insulated boom section of the boom of a bucket truck. The boom of a bucket truck is further provided in another aspect (Continued)

that includes at least one insulated boom section, a source of high volume and pressure, dry air, one or more interior air diffusers and one or more exterior air diffusers. A preheating air heater may be removably mounted into the boom.

34 Claims, 10 Drawing Sheets

(51) Int. Cl.
  *B08B 7/00* (2006.01)
  *B66F 11/04* (2006.01)
  *B66F 13/00* (2006.01)
(58) Field of Classification Search
  CPC .... B08B 7/0071; H01B 17/52; H01B 17/525; H01B 17/54; H02G 1/00; H02G 1/02; H02G 1/04; H02G 7/00; H02G 7/16
  USPC ........... 34/413; 95/25; 96/418, 419; 182/2.8, 182/2.4
  See application file for complete search history.

(56) References Cited

U.S. PATENT DOCUMENTS

| | | | | |
|---|---|---|---|---|
| 3,451,505 A | | 6/1969 | Hulin | |
| 3,670,849 A | * | 6/1972 | Milner, Jr. | B66F 11/046 182/19 |
| 3,791,484 A | * | 2/1974 | Harrison | E01D 19/106 182/2.2 |
| 3,984,054 A | * | 10/1976 | Frochaux | B08B 5/02 239/DIG. 21 |
| 4,085,519 A | * | 4/1978 | Masika | A47L 23/20 223/66 |
| 4,453,672 A | * | 6/1984 | Garnett | A62B 5/00 182/2.11 |
| 4,554,995 A | * | 11/1985 | Schlack | B66F 11/044 182/129 |
| 4,805,653 A | * | 2/1989 | Krajicek | B08B 9/0433 239/165 |
| 4,815,219 A | * | 3/1989 | Binger | F26B 25/14 34/91 |
| 4,877,422 A | * | 10/1989 | Walbridge | B01D 53/26 182/2.4 |
| 5,074,322 A | * | 12/1991 | Jaw | A47K 10/48 604/289 |
| 5,106,427 A | * | 4/1992 | Paris | H02G 1/02 134/180 |
| 5,431,178 A | * | 7/1995 | Chiu | H01L 21/67057 134/158 |
| 5,564,522 A | * | 10/1996 | Markin | B66F 11/044 |
| 5,826,859 A | * | 10/1998 | Kononov | B66F 11/046 254/134.3 R |
| 5,930,915 A | * | 8/1999 | Dhaemers | F26B 9/006 34/235 |
| 5,966,847 A | * | 10/1999 | Nathenson | E02F 3/9206 137/874 |
| 5,974,693 A | * | 11/1999 | Richards | D06F 58/04 34/184 |
| 6,071,428 A | * | 6/2000 | Franks | A61K 47/26 124/58 |
| 6,176,437 B1 | * | 1/2001 | Pedersen | B08B 5/02 239/570 |
| 6,464,569 B1 | * | 10/2002 | Thierer | B24C 3/065 451/92 |
| 6,523,221 B1 | * | 2/2003 | Dahlin | B08B 9/08 15/345 |
| 6,749,490 B1 | * | 6/2004 | Hafenrichter | B24C 3/062 451/75 |
| 8,112,902 B2 | * | 2/2012 | Muenzner | D06F 34/18 165/10 |
| 8,739,362 B1 | * | 6/2014 | Conder | B08B 5/02 15/406 |
| 9,188,508 B1 | * | 11/2015 | Meyer | G01M 99/005 |
| 9,630,218 B2 | * | 4/2017 | Kakutani | B08B 5/02 |
| 10,199,806 B2 | * | 2/2019 | Ewert | B24C 1/003 |
| 2004/0003511 A1 | * | 1/2004 | Silver | F26B 9/06 34/201 |
| 2004/0057336 A1 | * | 3/2004 | Smith | B66F 11/044 366/162.2 |
| 2004/0088879 A1 | * | 5/2004 | DuRapau | A47L 23/205 34/103 |
| 2004/0216269 A1 | * | 11/2004 | Slawinski | E06B 7/28 15/415.1 |
| 2004/0255986 A1 | * | 12/2004 | Lanoie | B08B 3/02 134/179 |
| 2005/0193585 A1 | * | 9/2005 | Silver | F26B 9/06 34/490 |
| 2006/0171660 A1 | * | 8/2006 | Hsu | A47K 10/48 386/358 |
| 2006/0277782 A1 | * | 12/2006 | Chen | F26B 9/003 34/92 |
| 2009/0044372 A1 | * | 2/2009 | Knopow | B08B 15/04 15/345 |
| 2009/0133721 A1 | * | 5/2009 | Campbell | A47L 25/00 134/201 |
| 2011/0154735 A1 | * | 6/2011 | Al Chalabi | B09B 3/00 48/197 A |
| 2011/0293484 A1 | * | 12/2011 | Stausgaard | A61L 9/205 422/116 |
| 2012/0017949 A1 | * | 1/2012 | Fehringer | E04D 13/106 134/34 |
| 2012/0138708 A1 | * | 6/2012 | Kamkar | B05B 7/0416 239/290 |
| 2013/0220389 A1 | * | 8/2013 | Snow | B08B 13/00 134/166 C |
| 2014/0182638 A1 | * | 7/2014 | Tebbens | A47L 5/14 134/198 |
| 2015/0290998 A1 | * | 10/2015 | Lustbader | B60H 1/00271 454/141 |
| 2015/0343585 A1 | * | 12/2015 | Weixler | B08B 5/02 15/316.1 |
| 2015/0370927 A1 | * | 12/2015 | Flaherty | F24F 11/30 703/1 |
| 2016/0017615 A1 | * | 1/2016 | Christian | E04G 1/18 137/1 |
| 2016/0174784 A1 | * | 6/2016 | Zagar | A47L 5/14 15/345 |
| 2016/0202474 A1 | * | 7/2016 | Rahbar-Dehghan | B08B 5/02 359/509 |
| 2016/0316884 A1 | * | 11/2016 | Ben-Hur | A45D 20/16 |
| 2016/0356008 A1 | * | 12/2016 | Jones | A47L 9/009 |
| 2017/0056938 A1 | * | 3/2017 | Pelletier | A46B 13/02 |
| 2017/0174488 A1 | * | 6/2017 | Sheeley | B66F 11/046 |
| 2017/0191272 A1 | * | 7/2017 | Ashton-Miller | A47L 5/36 |
| 2017/0204739 A1 | * | 7/2017 | Rawson | B08B 3/003 |
| 2017/0237242 A1 | * | 8/2017 | Ewert | B08B 5/02 451/39 |
| 2017/0259788 A1 | * | 9/2017 | Villa-Real | B08B 3/02 |
| 2019/0090713 A1 | * | 3/2019 | Krieg | B08B 1/007 |
| 2019/0141899 A1 | * | 5/2019 | Winsnes | B65G 45/005 414/519 |
| 2019/0252955 A1 | * | 8/2019 | Lanzinger | B05B 1/207 |
| 2020/0139555 A1 | * | 5/2020 | Paterni | B25J 11/0085 |
| 2021/0229137 A1 | * | 7/2021 | Van Voorhis | B05C 5/0241 |
| 2021/0323510 A1 | * | 10/2021 | Fiebrandt | B60S 1/481 |
| 2021/0380280 A1 | * | 12/2021 | Campbell | B08B 3/08 |
| 2021/0387596 A1 | * | 12/2021 | Fiebrandt | B05B 12/04 |
| 2022/0193734 A1 | * | 6/2022 | Cohrs | G02B 27/0006 |

OTHER PUBLICATIONS

Copenheaver, Blaine R., Written Opinion of the International Searching Authority for PCT/US2018/056528, dated Jan. 8, 2019, 3 pages, ISA/US, Alexandria, Virginia.

Ozsoy, Sevda, Supplementary European Search Report for EP 18 86 7630, dated Jul. 21, 2021, 11 pages, European Patent Office, The Hague, Netherlands.

(56) References Cited

OTHER PUBLICATIONS

Lazo, Eduardo Andres Navarro, Expert Response and Search Report to an Invention Patent Application No. 202001046, dated Jul. 30, 2021, 13 pages, Instituto Nacional de Propiedad Industrial Chile, Santiago, Chile.

Rao, O Prasad, Examination report under sections 12 & 13 of the Patents Act, 1970 and the Patents Rules, 2003 for Indian Patent Application No. 202027019831, dated Mar. 8, 2022, 5 pages, Intellectual Property India, Chennai, India.

* cited by examiner

SYSTEMS AND METHODS FOR DRYING AND CLEANING AN AERIAL LIFT ELECTRICALLY INSULATED BOOM

CROSS-REFERENCE TO RELATED APPLICATIONS

This application claims priority from U.S. Provisional Patent Application No. 62/574,005, filed on Oct. 18, 2017 and Canadian Patent Application No. 2,986,535 filed on Nov. 23, 2017, both entitled, "Systems and Methods for Drying and Cleaning An Aerial Lift Electrically Insulated Boom", entireties of which are incorporated herein by reference.

FIELD OF THE INVENTION

The present invention relates to an apparatus for at least drying an electrically insulated boom of an aerial lift, and methods for the use of same.

BACKGROUND

Maintenance of electrical transmission lines while they are energized is a common task that is completed using a variety of methods. One of these methods is direct contact, commonly referred to as "barehand", where a worker is insulated from the ground and then energized at the same potential as the live conductor. Using this method the worker can directly touch and manipulate the energized components as long as the worker is insulated and maintains an adequate distance from areas of different potential such as the ground or adjacent phases.

Insulation from the ground is typically accomplished through the use of an insulated aerial manlift commonly referred to as a bucket truck, such as the insulated boom of a bucket truck, as seen for example in FIG. 1. Bucket trucks commonly have a boom 2 comprising multiple boom sections, hingedly connected together, to allow added height and articulation of the bucket 6. The final boom section 4 is typically the only section that must be insulated. In a typical configuration all sections below the final boom section 4 may be made of steel with the final boom section 4 leading to the bucket 6 made with a dielectric, for example a length of hollow fiberglass or other non-conductive material. An insulated section 8 may be used to isolate the metal boom elbow 4C.

Regardless of bucket truck or insulated boom design, maintaining the dielectric properties of the insulated section are key to ensuring safety of the workers during barehand operations. During use, transportation, storage, etc. conductive particles from various sources including but not limited to soil, dust, salt, pollution, commonly collect on the exterior and interior surfaces of the insulated boom. The presence of these contaminates, in small amounts, will not by themselves cause a dielectric failure. Moisture can also appear on the surfaces of the insulated boom as a result of dew point, humidity, and precipitation, including rain, snow, fog or frost. Accumulation of moisture on the interior and exterior surfaces of the insulated boom in combination with these contaminants greatly decreases the surface electrical resistance of the boom. As the surface resistance decreases, current flowing on the inside and outside of the insulated boom section increases. At a certain point this current becomes so great that the insulated boom in fact becomes a conductive path to ground and a complete electrical failure or "flashover" can occur.

Contaminants on the surfaces of the insulated boom create areas of different resistance or conductance. If the distance between these areas is great enough and the insulation is clean enough, no current will flow. However with the addition of some moisture, resistance to conduction between the areas can be overcome and current will flow.

To avoid conducting current, insulated booms may be designed to deter moisture and for ease of cleaning. The outer surface of the boom is often smooth and coated with hydrophobic wax in order to resist the buildup of moisture and contaminants and to promote beading in the event of moisture build up. In some designs, the interior of the boom is sealed and a desiccant, such as silica gel is placed within the boom to collect moisture. However, most booms in common use are not sealed, as the interior spaces of the booms are often used to contain components for the control of the boom and bucket such as hydraulic lines, fiber-optic cables, and bucket leveling rods. To allow access to these components and to allow them to move as the bucket moves, the insulated section of the boom hereinafter referred to as the insulated boom, is left unsealed and open at either end.

Prior to and during barehand operations, the insulated boom is electrically tested and monitored for current leakage. Industry standards usually allow 1 micro-amp per kV of the voltage to ground. To measure leakage current, metal collector bands are typically located at the bottom end of the insulated section of the boom around the outside and inside of the boom. Also all hoses, fiber optic links and leveling rods have metal bands to collect any leakage current. All these collector bands are connected together and run through a current leakage meter to ground.

In a typical barehand procedure, the upper end of the boom is first energized by contacting one phase of the energized powerline and the leakage current of the insulated section of the boom is measured. If the leakage current is below the maximum level, the boom is left in place for three minutes and the leakage current is checked again. If the leakage current is above the maximum level, then the boom is immediately removed from the line and cleaned and dried. Usually high readings are the result of moisture and contamination on the inside and outside surfaces of the boom. Once the boom has been cleaned and dried it is retested. If leakage current is below the maximum level, then barehand work can proceed.

During the barehand work, the leakage current is constantly monitored and an audible alarm will sound if a preset leakage current value is exceeded. The normal leakage current value is usually well below the maximum allowed. Changing moisture conditions can cause the leakage current to increase and set off the alarm. If this occurs the boom is removed from the line, cleaned, dried and retested before work can begin again.

Controlling moisture levels on the interior and exterior surfaces of the boom is critical. In some jurisdictions or for some power utility companies work cannot be performed when humidity is above 80%. During periods of rapid temperature change, especially in humid environments, condensation will begin to form on the interior and exterior surfaces of the boom. If this occurs work must be halted, or cannot begin until the surface resistance of the boom has been restored. The surface moisture is wiped off using a clean rag, and the interior moisture must be allowed to dry. This is typically accomplished by raising the insulated section of the boom to a near vertical position and allowing ambient airflow to eventually dry the interior of the boom.

The boom may also be positioned in the sunlight if possible, in order to warm and facilitate evaporation from the boom as quickly as possible.

The result is that work cannot be completed during these periods of precipitation or humidity. Often an entire crew of people can spend hours waiting for conditions to improve and waiting for the interior and exterior of the insulated boom to dry before work can begin, causing insufficient and costly downtime.

In published US Patent Application, publication number US 2004/0255986, a superheated steam is flowed through a boom, then concentrated into a pressurized jet at the output end of the boom so as to be directed onto equipment to be cleaned.

U.S. Pat. No. 4,877,422 teaches drying the interior of an insulated boom by supplying a constant stream of non-heated air from an air source into the boom during the course of the barehand or other operations on conductors. Air exiting from an outlet end the boom is removed or purged to atmosphere and may be monitored for humidity. The air supply may be a compressor on the aerial lift truck. There is no suggestion of using an airstream on the outside of the boom, nor of re-utilizing the air stream flowing from the interior of the boom.

SUMMARY

A system is provided for use with an insulated boom section of the bucket truck so as to dry the insulated boom section. The system comprises a source of high volume and pressure dry air; one or more interior air diffusers positioned at a first end of the insulated boom section and connected to the source of high volume and pressure dry air to direct the air into the interior of the insulated boom section so as to flow from the first end to a second, opposite, end of the insulated boom section. One or more exterior air diffusers are positioned at the first end of the insulated boom section and connected to the source of high volume and pressure dry air to direct the air to along an exterior surface of the insulated boom section, from the first end to the second end of the insulated boom section.

In a further embodiment the system further comprises one or more vents positioned at the second end of the insulated boom section. The vents are in fluid communication between the interior and the exterior surface of the insulated boom section. A collector-diffuser is positioned at the second end of the insulated boom section to collect the air exiting the interior of the insulated boom section from the one or more vents and to diffuse the exiting air downwards along the exterior surface of the insulated boom section, in a direction from the second end to the first end. Preferably the second end of the boom is the distal end, distal from an elbow on the boom, and adjacent the bucket.

In one embodiment, the source of high volume and pressure dry air includes an electric heater-blower so as to both dry, heat and direct the airflow along the boom.

In a further embodiment, the source of high volume and pressure dry air includes an air dryer so as to dry the air being blown along the insulated boom section.

In a further embodiment, the system may also include one or more concentrator-diffusers positioned at intervals along the length of the insulated boom section to concentrate the air travelling along the exterior surface of the insulated boom section and direct it further along the exterior surface of the insulated boom section.

In a further embodiment, the system further comprises an air heater in connection with the source of high volume and pressure dry air.

A method is also provided for drying both the interior and exterior surfaces simultaneously of an insulated boom section of the boom of a bucket truck. The method includes the steps of providing a source of high volume and pressure dry air; directing the high volume and pressure dry air from the source into an interior of the insulated boom section from a first end to a second, opposite, end of the insulated boom section, and also simultaneously directing the source of high volume and pressure dry air from the source along an exterior surface of the insulated boom section, from the first end to the second end of the insulated boom section.

The boom of a bucket truck is further provided in another aspect of the invention that includes at least one insulated boom section adjacent a bucket of the truck, the insulated boom section comprising a first end, a second opposite end, an interior and exterior surface, a source of high volume and pressure dry air, one or more interior air diffusers positioned at the first end of the insulated boom section and connected to the source of high volume and pressure dry air to direct a flow of the air into the interior of the insulated boom section from the first end to the second opposite end; and one or more exterior air diffusers positioned at the first end of the insulated boom section and connected to the source of high volume and pressure dry air to direct a flow of the air to along the exterior surface of the insulated boom section, from the first end to the second opposite end.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings.

The drawings are not necessarily to scale and in some instances proportions may have been altered in order to more clearly depict certain features.

DETAILED DESCRIPTION OF VARIOUS EMBODIMENTS

The following description of embodiments is provided by way of illustration of an example, or examples, of particular embodiments of the principles of various aspects of the present invention. These examples are provided for the purposes of explanation, and not of limitation, of those principles and of the invention in its various aspects.

Figure 1:
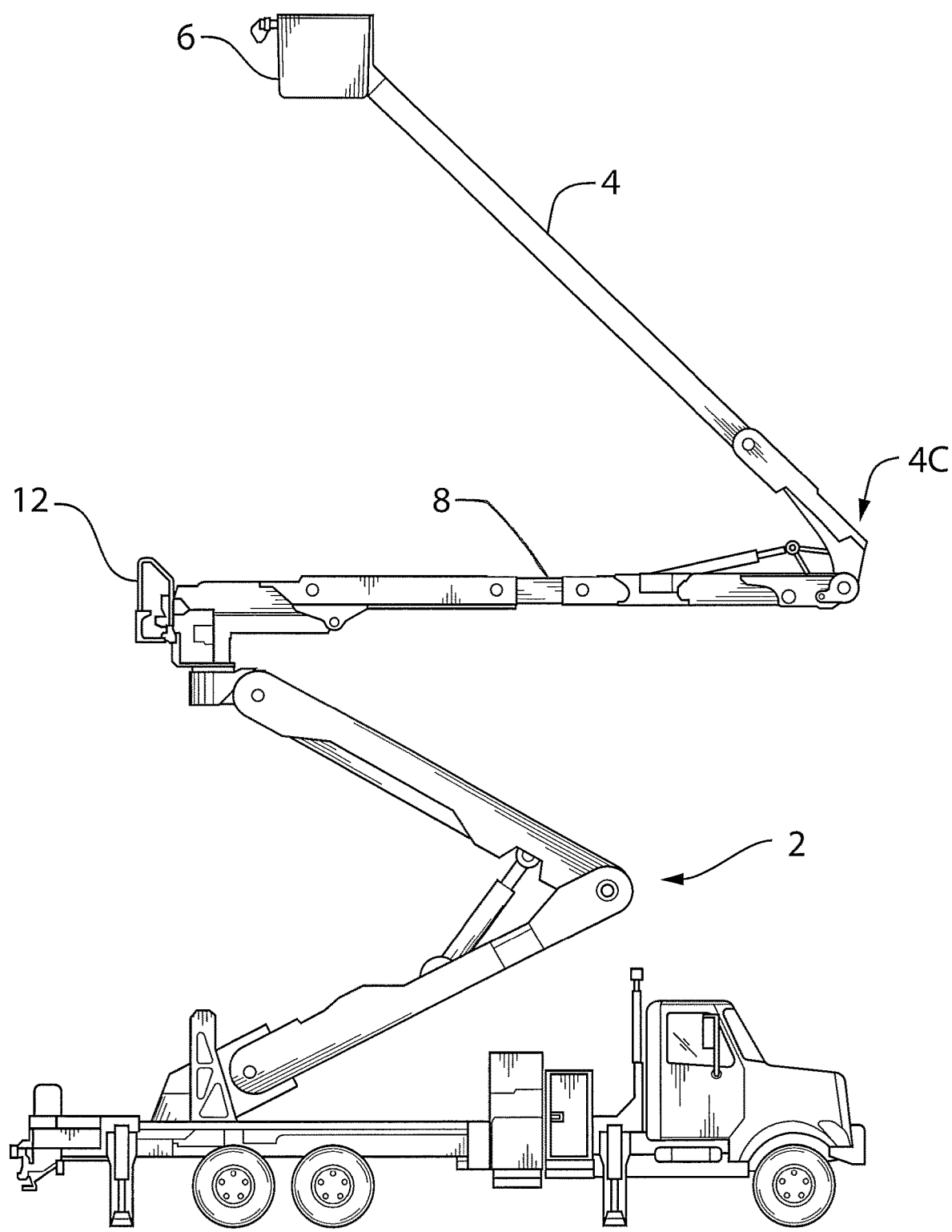
FIG. 1 is a side elevational view of a conventional or prior art bucket truck with boom and bucket partially extended from the truck; such could be used with the present invention.
Figure 2:
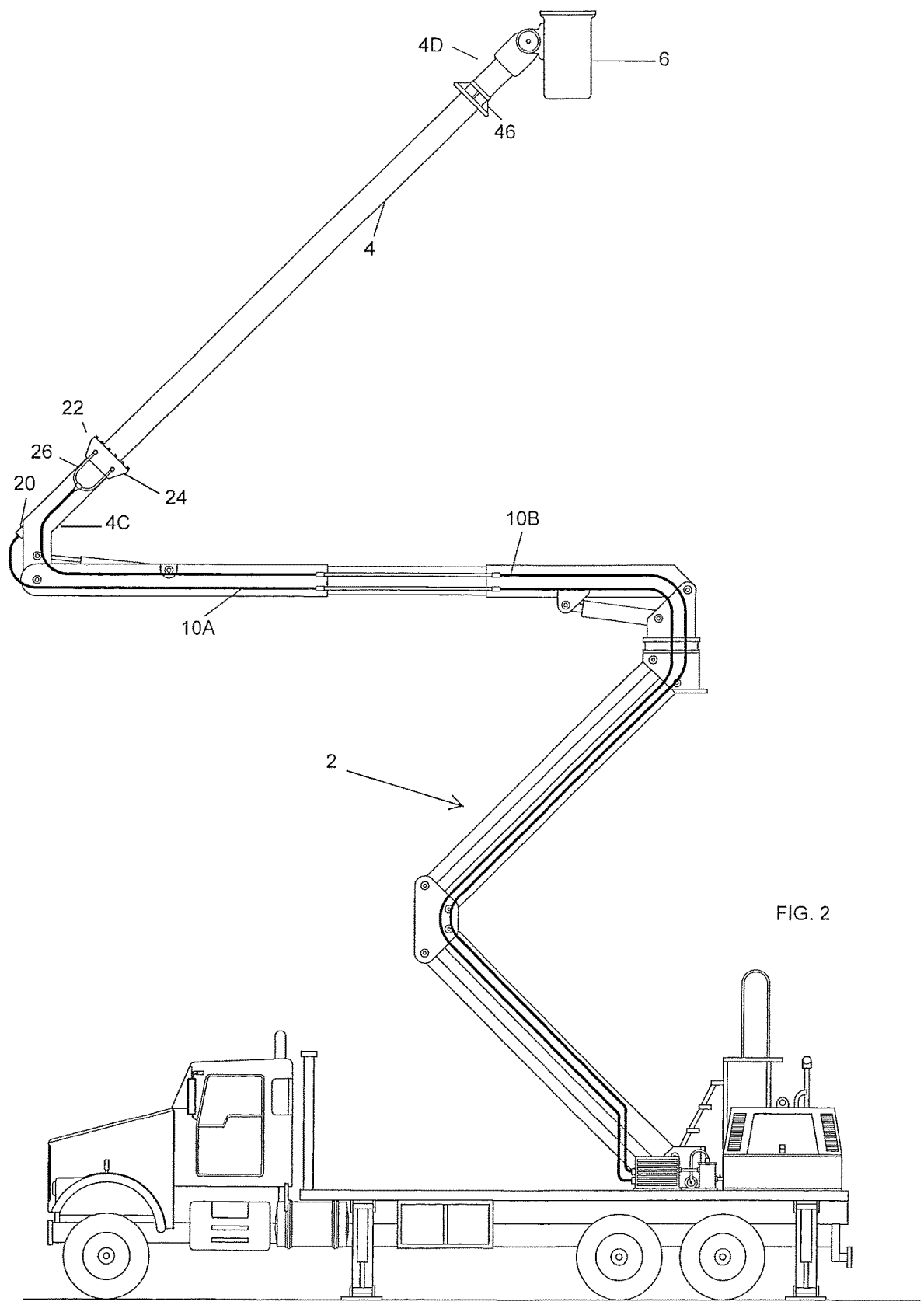
FIG. 2 is a side elevational view of a bucket truck with an insulated boom, adapted to include an air dryer according to one embodiment of an air source of the present invention.
Figure 3:
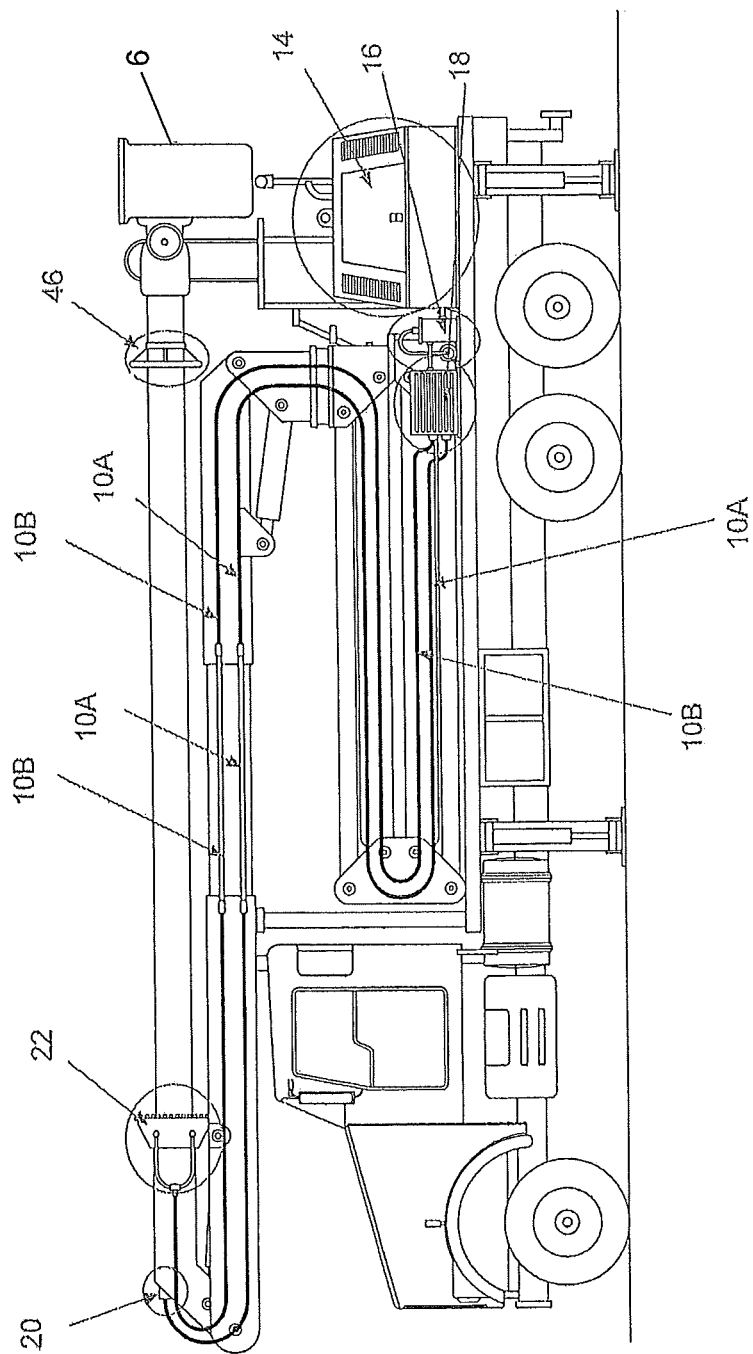
FIG. 3 is a side elevational view of the bucket truck of FIG. 2 with the boom retracted.
Figure 4:
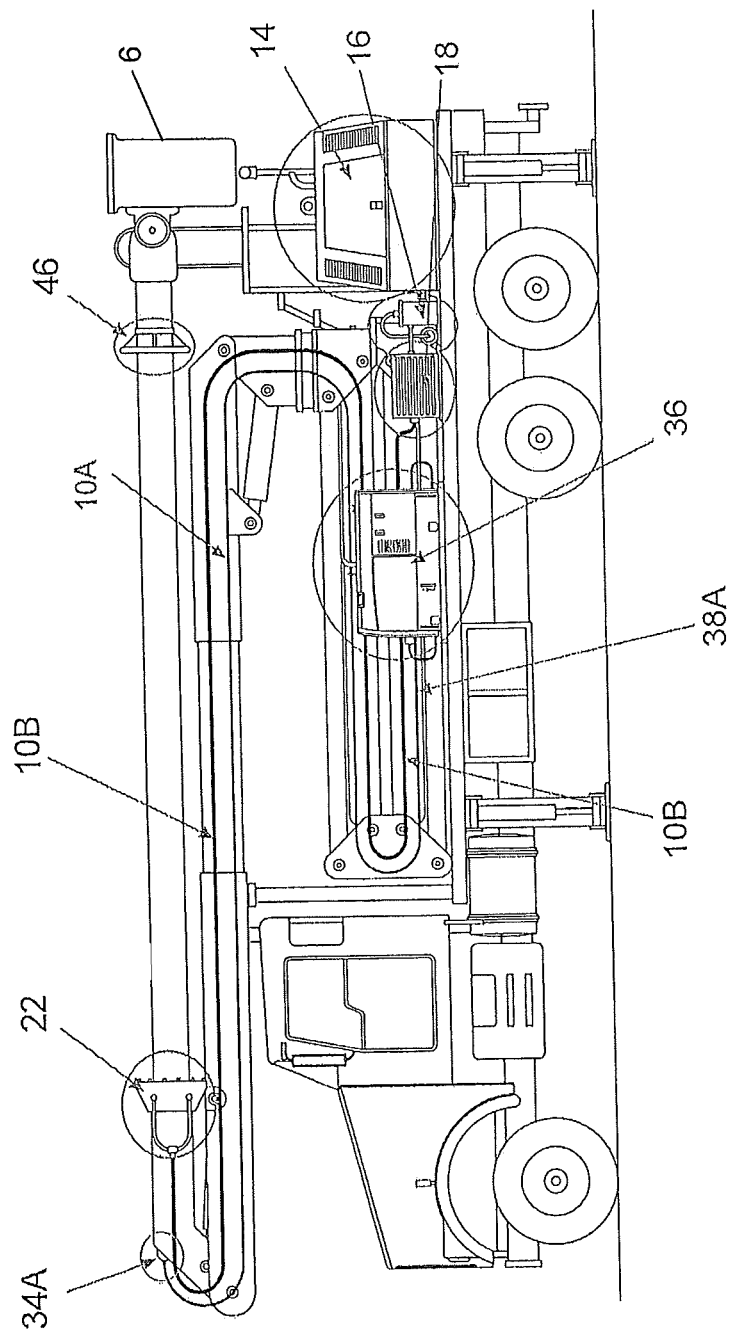
FIG. 4 is a side elevational view of the bucket truck of FIG. 3, showing a second embodiment of an air source.
Figure 5:
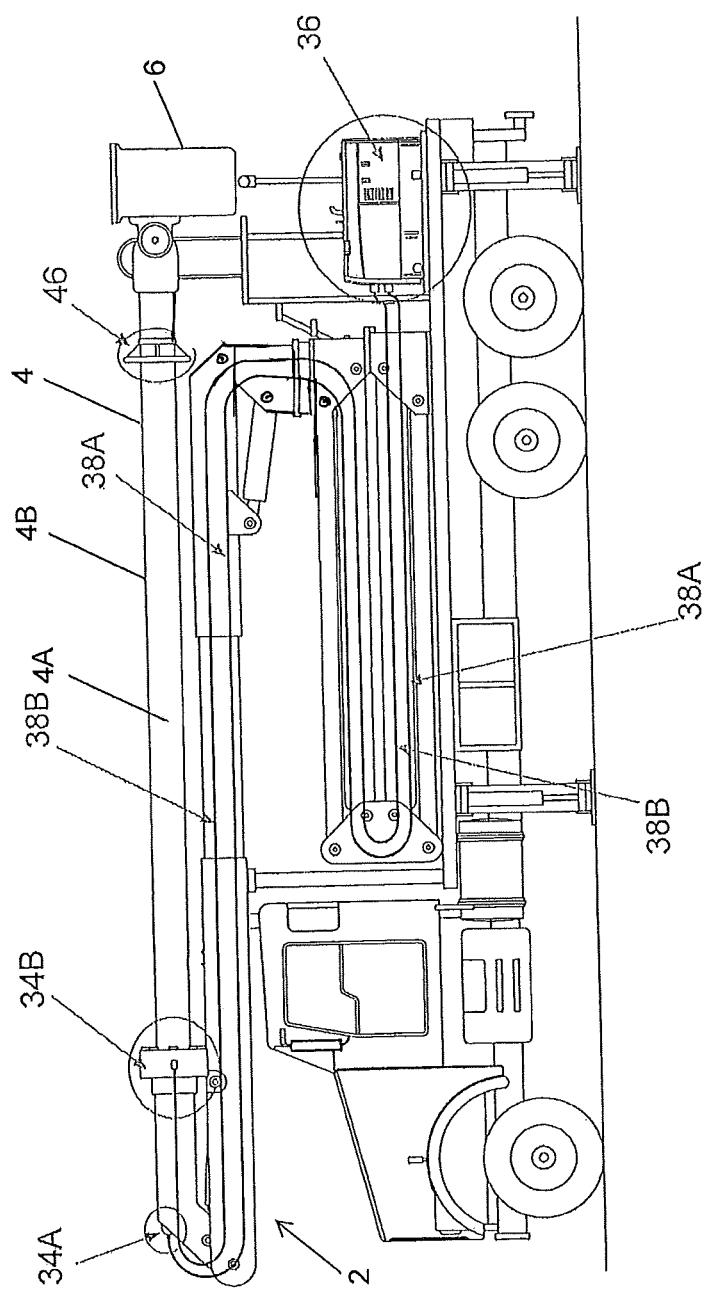
FIG. 5 is a side elevational view of the bucket truck of FIG. 4, showing a third embodiment of an air source.
Figure 6:
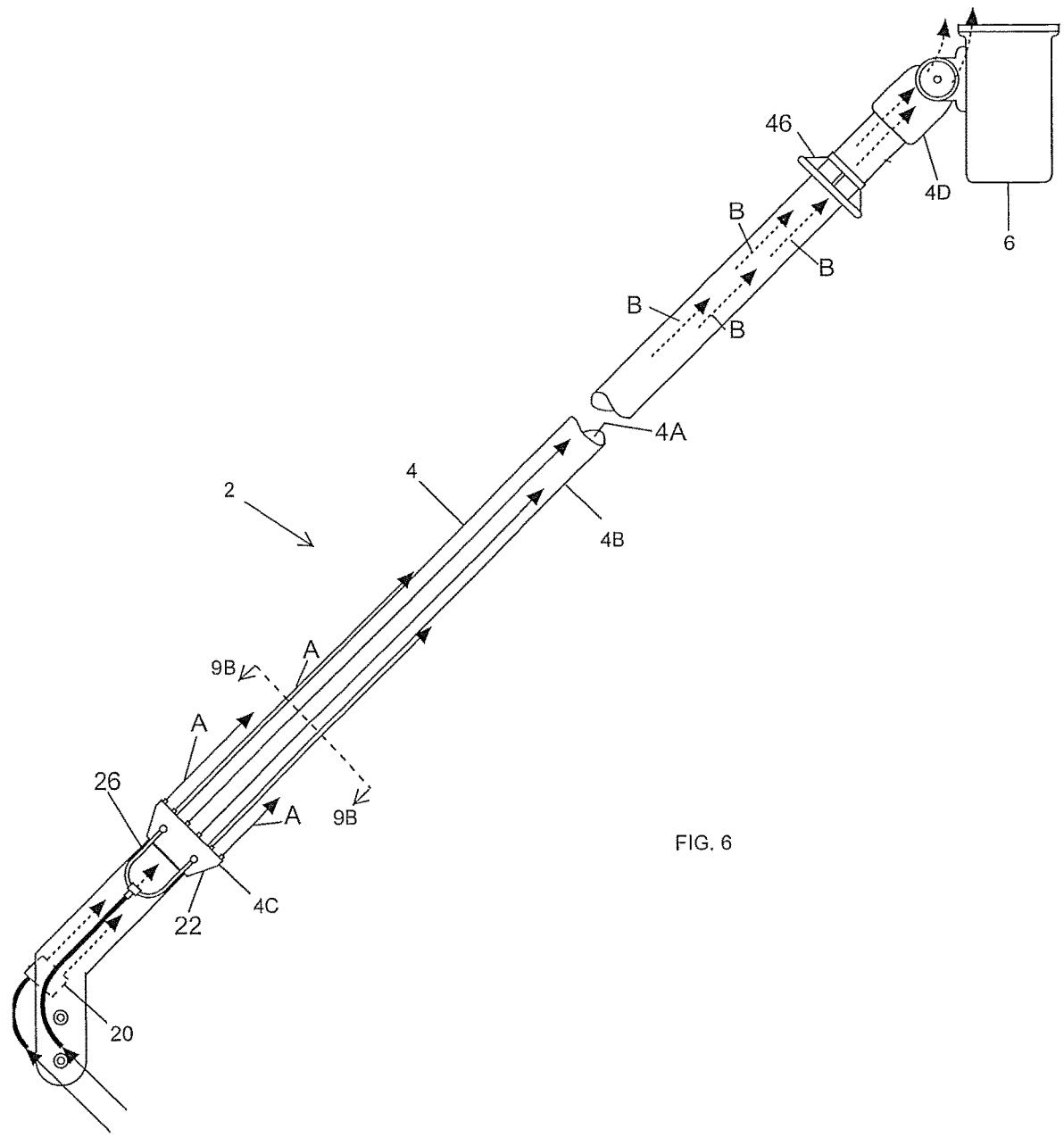
FIG. 6 is an enlarged, partially cutaway, side elevational view of the elbow, insulated boom, and bucket of FIG. 2 illustrating the air flow inside and along the outside of the boom according to one embodiment of the present invention.
Figure 6A:
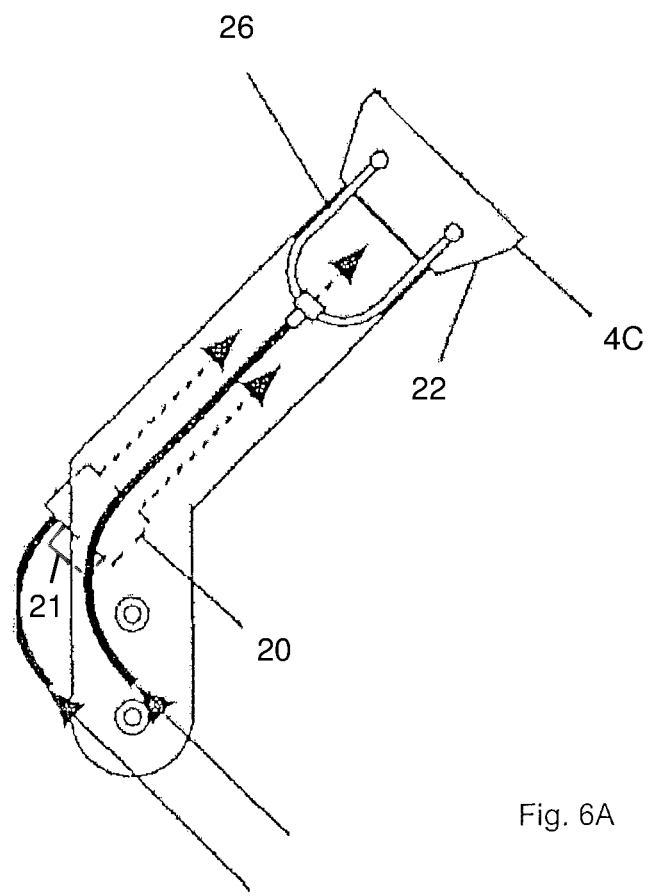
FIG. 6A is an enlarged portion of the view of FIG. 6.
Figure 7:
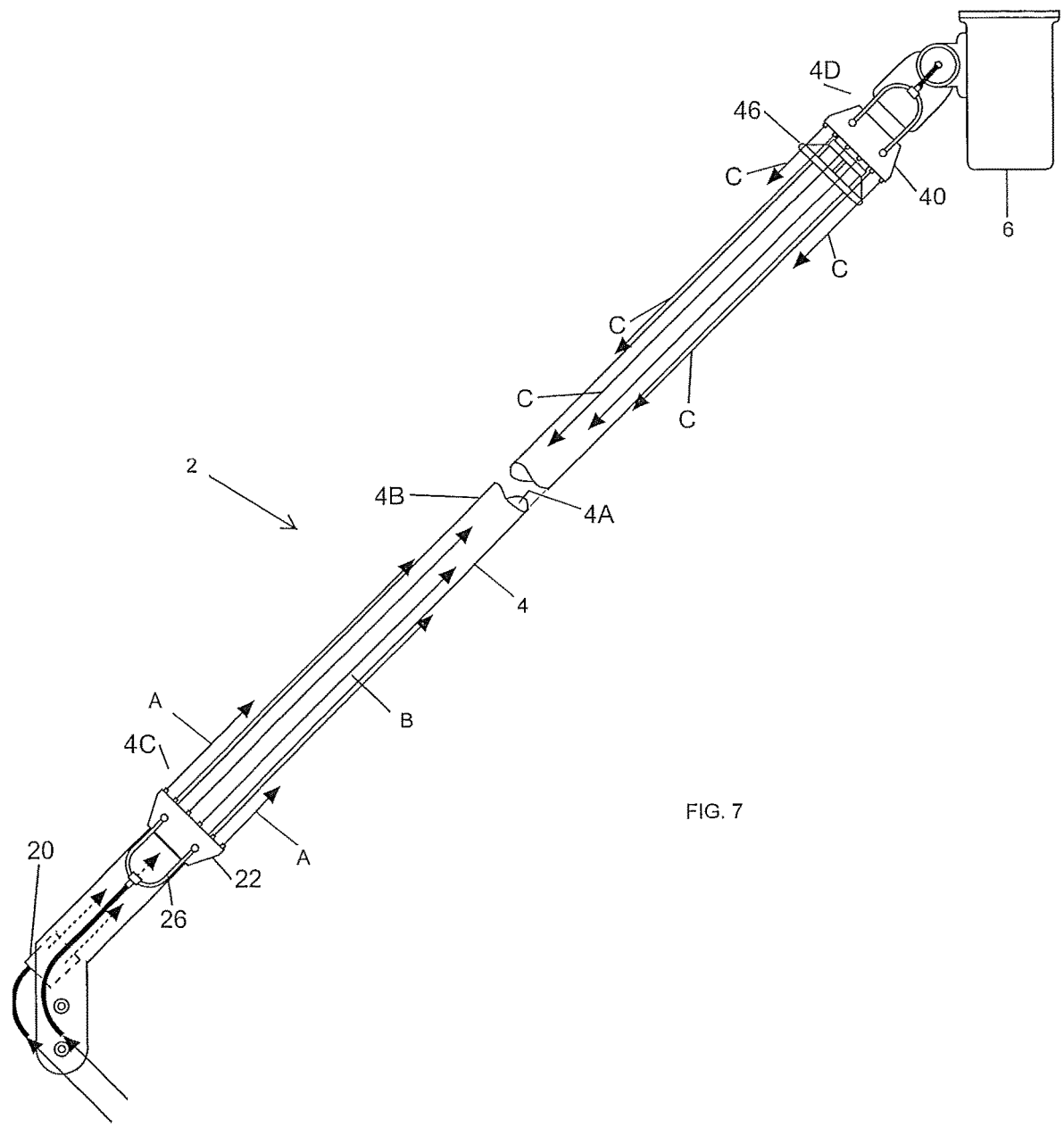
FIG. 7 is the side elevational view of the elbow, insulated boom and bucket of FIG. 6, illustrating air flow along the outside of the insulated boom section and air flow inside the boom being collected at the top and being redirected back downwards along the outside of the boom, showing a second embodiment of the present invention.

Generally, with reference to FIGS. 2 through 9B, and with initial reference to FIGS. 6 and 7, a gas, preferably air, is directed along the insulated boom section 4 of boom 2 so as to flow through the boom interior 4A, and simultaneously along the boom exterior 4B, of insulated boom section 4 of boom 2. For purposes of this description, insulated is intended to mean electrically insulating, dielectric, or electrically non-conducting. Before reaching the insulated boom section 4 of boom 2, the air is directed through air lines 10A along the boom interior 4A, and through air lines 10B along exterior surface 4B. Air flow can be controlled by regulators and valves anywhere along the air lines 10A and 10B. As depicted in at least FIG. 2, leading to the insulating boom section 4, air lines 10A and 10B may, as shown, be mounted along the exterior of the boom 2, although this is not intended to be limiting. Preferably air lines 10A and 10B run from the base of the boom 2, to the bottom of the insulated section of the boom 4.

Alternatively air lines 10A and 10B may be combined in a single air line (not shown). The single air line may then split into two, separate and dedicated air lines, one for each of boom interior 4A and boom exterior 4B at the base end of insulated boom section 4 and at such point the separate streams of the air flow may be controlled by separate regulators and valves.

In order to maintain insulating qualities of the insulated boom section 4, air lines 10A and 10B may preferably be comprised of electrically insulated hose or pipe. That is, the electrically insulated hose or pipe itself may be a dielectric material. Such electrically insulated hose or pipe may extend for example a full length from the air source, for example on the back of the bucket truck, to insulated boom section 4, or alternatively, air lines 10A and 10B can be non-insulated from the back or rear of the bucket truck up to the insulated boom section 4, except the air lines 10A and 10B can be electrically insulated along the insulated boom section 8.

Figure 9A:
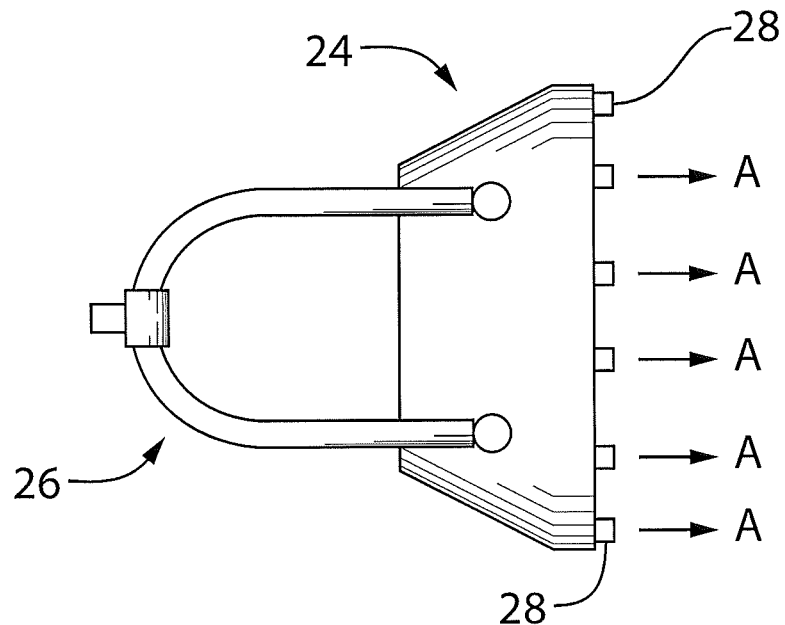
FIGS. 9A and 9B are side and front elevation views respectively of one embodiment of an air diffuser of the present invention.
Figure 9B:
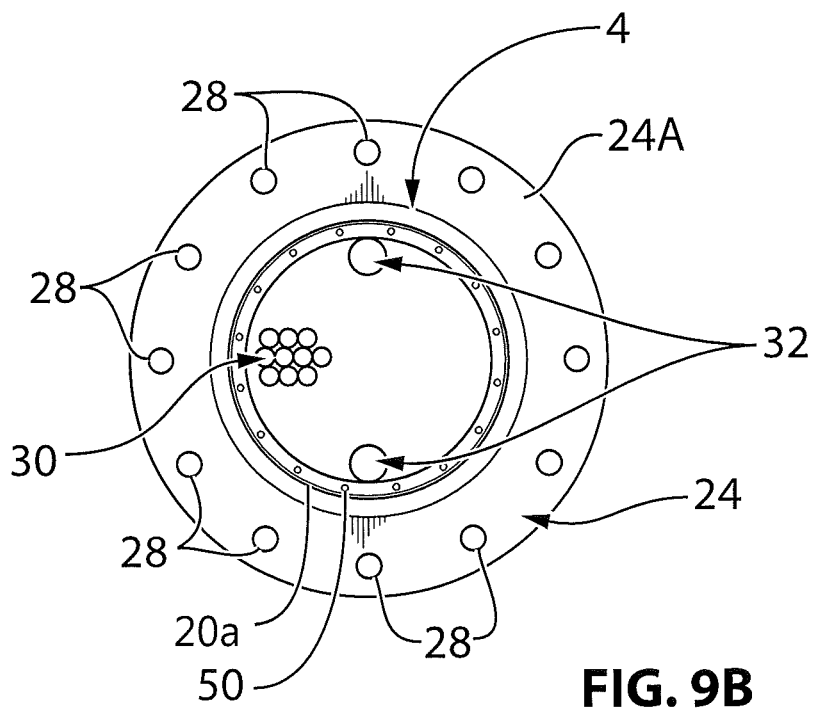

With references to the figures, the insulated boom section 4 may be provided with one or more internal and external air diffusers 20, 22 to deliver air to boom interior 4A and exterior 4B, respectively. The air may advantageously in one embodiment be warmed, dry air. Internal air diffuser 20 distributes air equally to, around and along the boom interior 4A of insulated boom section 4. External air diffuser 22 distributes air equally to, around, and along boom exterior 4B of insulated boom section 4. FIG. 9A depicts one embodiment of an external air diffuser 22, and FIG. 9B is a cross section along line 9B-9B of FIG. 6 showing an end view of both the internal air diffuser 20 and external air diffuser 22. The internal air diffuser 20 comprises a diffuser manifold body 20a that generally matches an internal circumference of the hollow cavity inside insulated boom section 4 and comprises one or more internal nozzles 50. The external air diffuser 22 includes a diffuser manifold body 24 that encircles the circumference of the insulated boom section 4 and defines an annular manifold feeding air to nozzles 28. For the purposes of the present invention, the term nozzle is used to include any opening, slot or aperture through which air can flow from the air lines 10A and 10B to the boom interior 4A or exterior 4B, respectively. The air diffuser body 24 may in one embodiment, not intended to be limiting, be split in to two or more air lines 26 between gas line 10B and manifold body 24. Air nozzles 28 encircle an external downstream surface or ring 24A on the downstream end of air diffuser body 24. Nozzles are radially positioned in an array around ring 24A, such as with equal arc length segments between the nozzles, so as to direct air flow in the direction of arrows A in a substantially uniform flow around and along exterior 4B of insulated boom section 4.

While the figures show air diffusers 20 and 22 being proximate a bottom end 4C of the insulated boom section 4 of the boom 2, with air flowing in the direction of arrows A and B towards upper end 4D, such as toward bucket 6, of the insulated boom section 4, it would be well understood by a person of skill in the art that air diffusers 20 and 22 may be placed proximal the upper end 4D of the insulated boom section 4, and gas flow would in such case be in the opposite direction of arrows A and B, towards the bottom 4C of the insulated boom section 4. Further, more than one of air diffuser 20 or 22 may be required along the length of boom section 4. The length of boom section 4 may be such that the air flow required to dry the interior or exterior of boom section 4, requires sufficient pressure and/or volume that the forced air flow is done in stages along boom section 4. Thus, a plurality of the diffusers 20, 22 may be spaced, e.g. equally spaced, along boom section 4.

The boom interior 4A may conventionally, as described earlier, carry or contain hydraulic hoses 30 and leveling rods 32. Consequently, flow of gas within and along boom interior 4A flowing in the direction of arrows B (shown as dotted lines in FIG. 6) is partially blocked or partially occluded, thereby increasing the surface area to be dried. All surfaces within boom interior 4A must be dried. Thus, any partial blockages within boom interior 4A make the drying more difficult or at least more time consuming as increased surface area must be covered and dried. The partial blockages may include the hoses and rods and any control and data conduits, wires, optical fibers, bundles, etc. that may be required to traverse the length of boom interior 4A, for example for the operation of the boom and bucket, connected equipment, winches and jibs, etc. Drying is, fortunately, assisted in that the rods, hoses, conduits, etc. extend longitudinally along boom interior 4A, thereby minimizing moisture pockets in the lee, i.e. immediately downwind, behind the partial blockages, which slow the drying by the air flowing in direction B.

The air flowing in boom interior 4A is injected into and along boom interior 4A from internal air diffuser 20. Although not shown, it will be understood by one skilled in the art that to achieve drying air flow in direction B, in one embodiment interior air diffuser 20 may include at least one manifold directing the air flow to nozzles within boom interior 4A which direct the high volume flow, advantageously under pressure as described below in direction B. For example the manifold for internal air diffuser 20 may function similarly to manifold 24, and may also be annular to distribute the air flow to nozzles arranged in a spaced apart array, circumferentially around the interior base end of boom interior 4A.

In one embodiment, air diffuser 20 is mountable into a port or otherwise through an opening in the lower elbow of the boom such as seen in FIG. 6, where diffuser 20 is shown in dotted outline. Such an opening or port into the elbow may be also used for removably mounting a blower, ceramic or other form of pre-heater or forced-air heater (collectively referred to herein as air-heater 21) into boom interior 4A, as better seen in FIG. 6A, for warming boom interior 4A when the boom is not in use; for example at night. Pre-heating or pre-warming the boom interior 4A by heater 21 may reduce the time required for the air diffuser 20 to otherwise dry boom interior 4A ready for operation. The pre-warming of the interior 4A may also reduce the time required to dry the exterior of the boom using air diffuser 22 for example. Heater 21 may be an electrical heater, for example powered by a small portable generator (not shown). Heater 21 may be independently mountable into boom interior 4A, and may preferably be removable therefrom so as to be removed from the boom during its operation. For example, heater 21 may be mounted through a sealable port into one of the boom elbows, so as to direct warm air upwardly along boom interior 4A. If heater 21 is left running for example overnight while mounted into boom interior 4A, it may be removed from the boom in the morning or otherwise prior to use of the boom. Heater 21 may also for example be mountable into a diffuser, e.g. diffuser 20, mounted in boom interior 4A so as to direct warm air through the diffuser and thereby into boom interior 4A.

The air may be any readily available inert gas, but is more preferably dry air. The air may be directed from the nozzles at either a high volume and low pressure, or at a low volume and high pressure, or at a high volume and high pressure. The movement of air simultaneously through the boom interior 4A and along the boom exterior 4B serves to provide both a drying effect to decrease moisture within boom interior 4A, and on the boom exterior 4B of the insulated boom section 4, as well as to physically move contaminants and any surface charges off the insulation and away from the grounded sections of the bucket truck. The air may advantageously be dried or dehumidified prior to being directed within and along the insulated boom section 4. Further preferably, the air may be heated to aid in evaporation and removal of moisture.

Any number of sources maybe used to provide the dried and optionally heated air. One or more electric style air heater/blowers may be installed on insulated boom section 4, at the bottom end 4C, and may be powered by the on-board electric power, battery, or generator, as examples. Alternatively, compressed, dried and optionally heated, air could be delivered via air lines 10A, and 10B to the bottom end of the insulated boom section 4 by an external air compressor driven by a gas, diesel, hydraulic or electric motor. Such an air compressor could be placed on the top of the bed of the bucket truck or in a towed trailer, but in either case the air compressor would be a separate portable unit. Dried and optionally heated and compressed or pressurized air would be delivered by means of an air hose installed within or alongside the lower boom sections and then delivered by means of a regulator and a valve for example located at the lower end of the insulated boom section 4 of the boom or at the air compressor.

In one embodiment of the present invention, illustrated in FIG. 3, air is provided to both of the internal surface 4A and external surface 4B of the insulated section of the boom 4 by means of an air compressor 14, air dryer 16, and optionally also a heater 18 to deliver, warmed if required, dry air.

The air compressor 14 may be of any type known in the industry including those run by diesel, gas, electricity or hydraulically. The air compressor 14 is preferably mounted on a deck of the bucket truck, but can also be provide on a separate trailer or vehicle (not shown). Connected to the air compressor 14 is the air dryer 16 to remove any moisture from the air. The air dryer 16 may be connected in series with the air compressor 14. The air dryer can be a standard air dryer or it can comprise an electric or gas heater to dry the air thereby removing humidity from the air.

In an optional embodiment, a heater 18 can be connected to a downstream end of the air dryer to warm the compressed or pressurized and dried air, to increase the effectiveness of removing moisture from the boom interior 4A and exterior 4B. The air can be delivered to a bottom end of the insulated boom section 4 via the air lines described above.

In a second embodiment of the present invention, which is not intended to be limiting, the supply of air over, across and in contact with the exterior 4B of the insulated boom section 4 comes from an air compressor 14, air dryer 16, and an optional heater 18. In this embodiment, an internal electric heater/blower 34A (shown in FIGS. 4 and 5 as replacing air diffuser 20) is used to blow dry, warm air to the boom interior 4A. The internal electric heater/blower 34A may be for example powered by batteries, the truck's electrical system, or a separate gas or diesel generator 36 (FIG. 5) mounted on the truck deck or mounted on a separate trailer or vehicle. Internal or external power lines 38A, 38B, also called electric cables, supply power to the internal electric heater/blower 34A from the generator 36. The internal electric heater/blower 34A is preferably located at the bottom end 4C of the insulated boom section 4 of the boom 2 to deliver dry, and optionally warmed, air to an interior 4A of the insulated boom section 4. More than one internal electric heater/blower 34A could also be used at the bottom of the insulated section 4 of the boom 2. In such embodiment, the internal electrical heater/blower 34A may serve the function of an exterior air diffuser as well.

As before, the air compressor 14 is preferably mounted on a deck of the truck, but can also be provide on a separate trailer or vehicle (not shown). Connected to the air compressor 14 is the air dryer 16 to remove any moisture from the air. In an optional embodiment, a heater 18 can be connected to a downstream end of the air dryer to warm the compressed and dried air, to increase the effectiveness of removing moisture from the boom interior 4A and boom exterior 4B. The air can be delivered to a bottom end of the insulated boom section 4 of the boom 2, via an external airline 10B alongside the lower sections of the boom 2. Air flow may be controlled by a regulator and valve anywhere along the external airline 10B. Again, an external air diffuser 22 is used to direct the air flow along an external surface 4B of insulated boom section 4 of the boom 2.

In a third embodiment, as illustrated in FIG. 5, air is delivered to both the boom interior 4A and boom exterior 4B of the insulated boom section 4 of the boom 2 by means of electric heater/blowers 34A, 34B. An exterior electrical heater/blower 34B delivers dry air, warmed if required, to the exterior surface of boom exterior 4B. More preferably, the exterior electrical heater/blower 34B serves as the external diffuser as well as the heater/blower.

In this third embodiment, to dry the boom interior 4A, an internal electric heater/blower 34A is also used to blow, dry warm air through, and when positioned in an in-use position, up through the boom interior 4A. These electric heater/blowers 34A, 34B may be powered by batteries, the electrical system of the truck or optionally by a separate gas or diesel generator 36 mounted on a deck of the truck or mounted on a separate trailer or vehicle.

Power to the electric heater/blowers may be delivered to the bottom of the insulated boom section 4 of the boom 2 via one or more electric cables 38A, 38B alongside or inside the lower sections of the boom 2. More than one electric heater/blower 34A, 34B could also be used at the bottom of the insulated boom section 4 of the boom 2. Air flow can be controlled by adjustable switches anywhere along the electric cables 38A, 38B, to the insulated boom section 4 of the boom 2.

Figure 8:
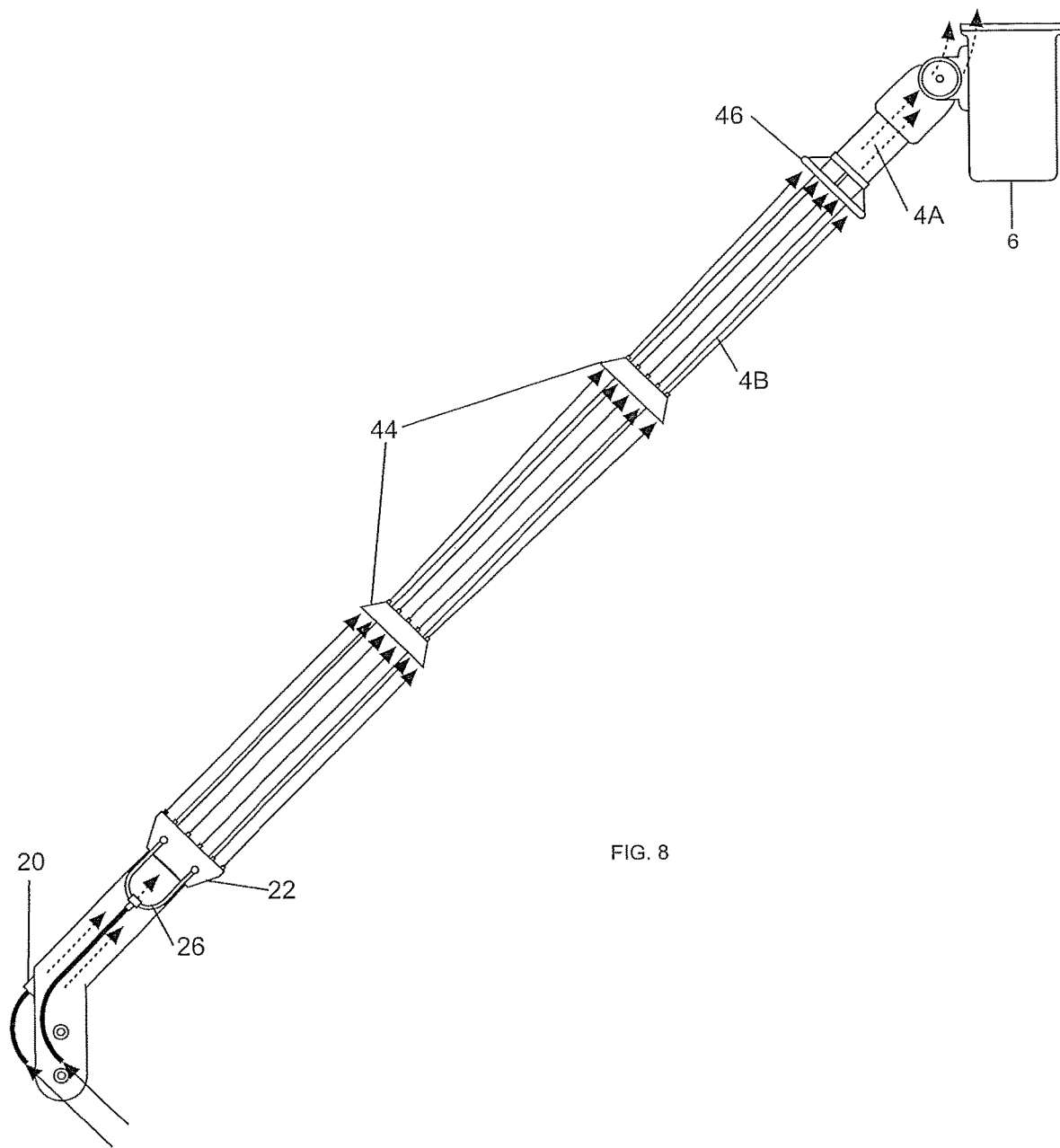
FIG. 8 is the side elevational view of the elbow, insulated boom and bucket of FIG. 7, illustrating air flow inside the insulated boom section and air flow along the outside of the insulated boom and being collected and redirected along the outside of the boom and further being collected and redirected along the outside of the insulated boom, showing a third embodiment of the present invention.

As described above and again, with reference to FIGS. 6, 7 and 8, air is delivered and flows within, and over the external surface of, the insulated boom section 4 of the boom 2. While FIGS. 6, 7 and 8 illustrate air diffusers 20 and 22, another aspect of the invention is that the flow configurations of these figures can equally be achieved by use of either an internal electric heater/blower 34A in connection with air flow to an interior 4A of the boom 2, or an external electric heater/blower 34B in connection with air flow on an exterior 4B of the boom 2, or a combination of both internal electric heater/blower 34A and external electric heater/blower 34B. Moreover, any combination of the embodiments of FIGS. 6, 7 and 8 may be used together for the purposes of delivering and distributing air flow within and along the insulated boom section 4.

With reference to FIG. 6, in a first embodiment, air flow through the boom interior 4A and air flow along boom exterior 4B of the boom 2 are both allowed to dissipate upwardly as a discharge from the upper end 4D of the boom 2, which is at or proximate bucket 6. As described above, in FIG. 6, the solid arrows A represent air flow along the exterior surface of boom exterior 4B and dashed arrows B represent air flow within boom interior 4A, including along interior surfaces of insulated boom section 4.

With reference to FIG. 7, in a second embodiment, air flow from boom interior 4A may be collected at top or upper end 4D of the insulated boom section 4 in an internal collector/diffuser 40. The collected air flow can then be redirected 180 degrees in direction C back down along the exterior boom surface 4B as the internal air flow in direction B is redirected by collection/diffuser 40 along boom exterior 4B by the internal collector/diffuser 40. Air collection and redirection, in a revolving cycle, may be repeated multiple times. In this embodiment, energetic air flow is thus directed over the boom exterior 4B of the insulated boom section 4 by the two opposed facing external air diffusers 22 and 40. This of course assumes that the internal air flow in direction B from air diffuser 20 is sufficiently energized (sufficiently high volume and/or high pressure) within the confines of boom interior 4A so that even with pressure losses along boom interior 4A, the air flow has sufficient energy once redirected by air diffuser 40 to assist in moisture removal by blowing back along boom exterior 4B.

To provide communication between the insulated boom interior 4A and the insulated boom exterior surface 4B one or more vents may be formed at the end of the insulated boom section 4 near the corona ring 46. In a further preferred embodiment, one or more vanes (not shown) may be fixed into each vent to drive dry high-pressure air from the insulated boom interior 4A to the insulated boom exterior surface 4B of the insulated boom section 4 of the boom 2. In environments with light precipitation or high humidity, the insulated section of the boom 4 between the corona ring 46 and the bottom of the boom 4C, is the most critical. The air diffuser is most preferably located near the corona ring to drive high-pressure air exiting the insulated boom interior 4A back along the insulated boom exterior 4B of the insulated boom section 4 at the energized end 4D.

With reference to FIG. 8, in a third embodiment, one or more external collectors/diffusers 44 can be installed along a length of the insulated boom exterior 4B. More preferably the external collector/diffusers 44 may be cone-shaped or frusto-conical (with the narrow end downstream), to gather air flow as it travels along insulated boom exterior 4B, and to re-concentrate the air flow and direct the air flow as a re-concentrated flow flowing down stream further along the insulated boom exterior 4B. This may be thought of a boosting the flow in stages along insulated boom section 4. Thus, the air flow is enhanced along the full length of the exterior surface of the insulated boom section 4 of the boom 2, therefore enhancing drying and/or cleaning of insulated boom exterior 4B of insulated boom 44B.

In supplying air to the insulated boom section 4 of the boom 2, the interior and exterior air lines 10A, 10B may be insulated, that is, dielectric, air hoses. Such air hoses may be plumbed through the boom interior 4A and may then be directed at specific points outwards onto the boom exterior 4B.

The high pressure and/or high volume dry air delivered along insulated boom section 4 serves to rapidly and simultaneously dry both the insulated boom interior 4A and insulated boom exterior 4B and reduces the wait time required before work can begin using the boom 2 for barehand operations in an energized environment. The system may further provide the insulated boom section 4 with interior and exterior drying during energized work in adverse conditions such as during periods of high humidity.

The present system for providing and distributing high volume and pressure air along the exterior surface of the insulated boom further serves to strip charged particles and contaminants from the surface of the insulation and drive them off the surface of the boom and away from the grounded end of the insulated section. By continually removing interior and exterior moisture and exterior surface charge and contamination, the insulated boom inhibits areas of differing potential from developing that may lead to dielectric failure of the insulated section. Removing these charged particles from the surface of the insulated boom section 4 will also work to decrease leakage current moving along the insulated section of the boom.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A system for drying an insulated boom section of a bucket truck, said system comprising,
   a. a source of high volume and pressure, dry air;
   b. one or more interior air diffusers adapted to be positioned at a first end of said insulated boom section, wherein the one or more interior diffusers are arranged to match a geometry of an interior of the insulated boom section at the first end and are adapted to be connected to the source of high volume and pressure, dry air to direct a first substantially uniform flow of air into, around and along the interior, from the first end to a second opposite end of the insulated boom section, to remove moisture from the interior; and
   c. one or more exterior air diffusers adapted to be positioned at the first end of said insulated boom section, wherein the one or more exterior diffusers are arranged to match a geometry of an exterior surface of the insulated boom section at the first end and are adapted to be connected to the source of high volume and pressure, dry air to direct a second substantially uniform flow of air to, around and along the exterior surface, from the first end to the second opposite end of the insulated boom section, to remove moisture from the exterior surface.

2. The system of claim 1 further comprising a second air heater, wherein the second air heater is removably mounted into the insulated boom section through a port whereby the insulated boom section is pre-heated by the second air heater.

3. The system of claim 2, wherein the second air heater is a forced-air heater.

4. The system of claim 3, wherein the port is at a lower end of the insulated boom section.

5. The system of claim 1, wherein the source of high volume and pressure, dry air is an electric heater-blower.

6. The system of claim 5, wherein the electric heater-blower further serves as one or more of the interior air diffusers and the exterior air diffusers.

7. The system of claim 1, wherein the one or more external air diffusers is a single exterior air diffuser comprising an annular manifold to direct and distribute the second substantiality uniform flow of air.

8. The system of claim 7, wherein the annular manifold comprises one or more nozzles on a surface thereof.

9. The system of claim 1, further comprising
   a. the insulated boom section;
   b. one or more vents positioned at the second opposite end of the insulated boom section and in fluid communication between the interior and the exterior surface of the insulated boom section; and
   c. a collector-diffuser positioned at the second opposite end of the insulated boom section to collect air exiting the interior of the insulated boom section from the one or more vents and diffusing the exiting air along the exterior surface of the insulated boom section, from the second end to the first end.

10. The system of claim 1, wherein the source of high volume and pressure, dry air is a compressor and an air dryer.

11. The system of claim 1 further comprising, when the system of claim 1 is mounted on the insulated boom section, one or more concentrator-diffusers positioned at intervals along the length of the insulated boom section to concentrate air travelling along the exterior surface of the insulated boom section and to direct it further along the exterior surface of the insulated boom section.

12. The system of claim 1 further comprising a first air heater in connection with the source of high volume and pressure, dry air.

13. The system of claim 1, wherein the first end of the insulated boom section is a bottom end of the insulated boom section and the second opposite end of the insulated boom section is an upper end of the insulated boom section.

14. The system of claim 1, wherein the one or more interior air diffusers is a single interior air diffuser comprising an annular manifold to direct and distribute the first substantially uniform flow of air.

15. The system of claim 1, wherein the one or more interior and exterior air diffusers are adapted to direct the first and second substantially uniform flows of air, respectively, simultaneously.

16. A method for drying an interior and an exterior surface of an insulated boom section of an aerial lift truck using the system of claim 1, the method comprising the steps of
   a. supplying the high volume and pressure, dry air;
   b. directing in first direction, the first substantially uniform flow of air into, around and along the interior of the insulated boom section to remove moisture from the interior; and
   c. simultaneously directing in a second direction, the second substantially uniform flow of air to, around and along the exterior surface of the insulated boom section to remove moisture from the exterior surface.

17. The method of claim 16 wherein the steps of directing in a first direction and simultaneously directing in a second direction comprises directing the first and second substantially uniform flows of air from a first end to a second opposite end of the insulated boom section.

18. The method of claim 1, wherein directing the first and second substantially uniform flows of air from the first end to the second opposite end comprises directing air from a bottom end of the insulated boom section to an upper end of the insulated boom section.

19. The method of claim 16 further comprising supplying the high volume and pressure, dry air from an electric heater-blower.

20. The method of claim 16 further comprising supplying the high volume and pressure, dry air from a compressor and an air dryer.

21. The method of claim 16 further comprising the steps of:
   a. concentrating air travelling in the second direction along the exterior surface of the insulated boom section at one or more intervals; and
   b. directing said concentrated air further along the exterior surface of the insulated boom section between said intervals.

22. The method of claim 16 further comprising a step of heating the high volume and pressure, dry air.

23. A bucket truck comprising
  a. at least one insulated boom section adjacent a bucket of the truck, the at least one insulated boom section comprising a first end, a second opposite end, an interior and an exterior surface;
  b. a source of high volume and pressure, dry air,
  c. one or more interior air diffusers positioned at the first end of the insulated boom section, wherein the one or more interior diffusers are arranged to match a geometry of the interior of the insulated boom section at the first end and are connected to the source of high volume and pressure, dry air to direct a first substantially uniform flow of air into, around and along the interior of the insulated boom section, from the first end to the second opposite end, to remove moisture from the interior; and
  d. one or more exterior air diffusers positioned at the first end of the insulated boom section, wherein the one or more exterior diffusers are arranged to match a geometry of the exterior surface of the insulated boom section at the first end and are connected to the source of high volume and pressure, dry air to direct a second substantially uniform flow of air to, around and along the exterior surface of the insulated boom section, from the first end to the second opposite end, to remove moisture from the exterior surface.

24. The bucket truck of claim 23, wherein the one or more interior air diffusers is a single interior air diffuser comprising an annular manifold to direct and distribute the first substantially uniform flow of air.

25. The bucket truck of claim 24, wherein the annular manifold comprises one or more nozzles on a surface thereof.

26. The bucket truck of claim 23, wherein the one or more air diffusers is a single exterior air diffuser comprising an annular manifold to direct and distribute the second substantially uniform flow of air.

27. The bucket truck of claim 26, wherein the annular manifold comprises one or more nozzles on a surface thereof.

28. The bucket truck of claim 23, wherein the source of high volume and pressure, dry air is an electric heater-blower.

29. The bucket truck of claim 28, wherein the electric heater-blower further serves as one or more of the interior air diffusers and the exterior air diffusers.

30. The bucket truck of claim 23 further comprising:
  a. one or more vents positioned at the second end of the insulated boom section, and in fluid communication between the interior and the exterior surface of the insulated boom section; and
  b. a collector-diffuser positioned at the second end of the insulated boom section to collect air exiting the interior of the insulated boom section from the one or more vents and diffusing the exiting air along the exterior surface of the insulated boom section, from the second end to the first end.

31. The bucket truck of claim 23, wherein the source of high volume and pressure, dry air is a compressor and an air dryer.

32. The bucket truck of claim 23 further comprising one or more concentrator-diffusers positioned at intervals along the length of the insulated boom section to concentrate air travelling along the exterior surface of the insulated boom section and to direct it further along the exterior surface of the insulated boom section.

33. The bucket truck of claim 23 further comprising an air heater in connection with the source of high volume and pressure, dry air.

34. The bucket truck of claim 23, wherein the first end of the insulated boom section is a bottom end of the insulated boom section and the second opposite end of the insulated boom section is an upper end of the insulated boom section.

* * * * *